United States Patent [19]

Taggart et al.

[11] Patent Number: 5,145,586
[45] Date of Patent: Sep. 8, 1992

[54] METHOD OF OIL/WATER SEPARATION UTILIZING COALESCING BODIES

[75] Inventors: Davis L. Taggart, Tulsa, Okla.; Russell L. McGalliard, Lenoir, N.C.; Ralph R. Eguren, Tulsa; David G. Hild, Broken Arrow, both of Okla.

[73] Assignee: Amoco Corporation, Chicago, Ill.

[21] Appl. No.: 554,306

[22] Filed: Jul. 17, 1990

[51] Int. Cl.⁵ .................................. B01D 17/022
[52] U.S. Cl. ........................... 210/708; 210/799; 210/DIG. 5
[58] Field of Search ............... 210/693, 708, 786, 799, 210/800, DIG. 5

[56] References Cited

U.S. PATENT DOCUMENTS

| | | | |
|---|---|---|---|
| 3,478,873 | 11/1969 | McLean | 210/799 |
| 3,893,925 | 7/1975 | Jones | 210/266 |
| 3,902,996 | 9/1975 | Murkes | 210/799 |
| 4,115,266 | 9/1978 | Oshima | 210/786 |
| 4,406,793 | 9/1983 | Kruyer | 210/693 |
| 4,601,825 | 7/1986 | Ericksson | 210/DIG. 5 |
| 4,780,219 | 10/1988 | Witek | 210/786 |

Primary Examiner—Thomas Wyse
Attorney, Agent, or Firm—Marcy M. Lyles

[57] ABSTRACT

This invention relates to water pollution control and concerns a method for removing dispersed oil droplets from water by contacting oleophilic bodies with an oil-water emulsion before the emulsion is separated in a settling tank. Oleophilic bodies which float on oil are provided in a settling tank into which an oil-water emulsion is introduced downwardly. Oil-free water is drawn off at the bottom of the tank.

7 Claims, 3 Drawing Sheets

METHOD OF OIL/WATER SEPARATION UTILIZING COALESCING BODIES

FIELD OF THE INVENTION

The present invention relates primarily to separation of oil from water within a gravity separation device. More particularly, the invention relates to improving the separating efficiency of a gravity separation device by using coalescing bodies to assist in coalescing oil droplets.

SETTING OF THE INVENTION

Environmental regulations impose strict requirements upon the level of contaminant in water which is disposed of. For example, in the oil production industry, water is usually produced with the oil and then separated and disposed of. Acceptable levels of oil contamination can range from 15–48 parts per million oil in the water. With these strict requirements, efforts are being made to improve oil/water separation technology.

Gravity separation devices are often used for separation of oil from water. An oil/water emulsion is usually introduced below the fluid surface in the gravity separation device. The gravity separation device is sized to provide a sufficient average residence time for the oil/water emulsion within the separation device to allow gravity separation to occur. The oil, which is less dense than the water, tends to rise while the water tends to settle. Separated oil is removed near the top of the separation device and separated water is removed near the bottom of the separation device.

A decrease in separating efficiency occurs in a gravity separation device if the oil droplets within the emulsion become smaller, as often occurs in the oil production industry. It is well known that smaller oil droplets rise more slowly than larger oil droplets. Thus, it takes longer for gravity separation to occur when the oil droplets become smaller. For a gravity separation device that has been sized to provide a certain average residence time for the oil/water emulsion within the device, a decrease in oil droplet size causes a decrease in separating efficiency. That is, the rate of oil/water emulsion requiring separation and the size of the gravity separation device do not change, thus the average residence time during which gravity separation can occur does not change. However, because the size of the oil droplets within the emulsion is smaller, the average residence time is not sufficiently long to allow gravity separation to occur. Thus, some of the oil droplets are removed with the water.

The small oil droplet problem can be minimized by causing the oil droplets within the oil/water emulsion to coalesce into larger droplets before the emulsion is introduced into a gravity separation device. For example, U.S. Pat. No. 3,902,996 discloses a coalescing method wherein the dispersed phase of an emulsion is coalesced by passing the emulsion through a bed of bodies located between an inlet and an outlet and which have an affinity for the dispersed phase. The emulsion is caused to flow upwardly through the bed of bodies, the entire bed being lifted by the flowing emulsion to a restraining net through which the emulsion, but not the bodies, may pass. Similarly, U.S. Pat. No. 4,406,793 discloses a coalescing method wherein the dispersed phase of an emulsion is coalesced by contacting the emulsion with bodies having an affinity for the dispersed phase restrained within a rotating, horizontal tumbler.

The above-described methods comprise contacting bodies having an affinity for a dispersed phase with an emulsion to cause coalescence of the dispersed phase. However, each method is utilized within a coalescing device through which an emulsion is passed to facilitate subsequent separation. A need exists for a method of coalescing a dispersed phase within a gravity separation device.

A gravity separation device which utilizes coalescing bodies is disclosed in U.S. Pat. No. 3,893,925. This separation device includes a vessel containing a bed of granular sulfur, which is denser than the oil/water emulsion in the vessel, supported by an inverted cone within the vessel. As an oil/water emulsion flows downwardly through the rigidly restrained granular sulfur, the oil coalesces into larger droplets. The coalesced oil and the water flow through perforations in the cone. The coalesced oil collects in protected channels on the underside of the cone and rises to an oil outlet where it is removed. Water settles downwardly to a water outlet where it is removed.

While the above-described gravity separation device employs downward introduction of emulsion and utilizes a method of coalescing a dispersed phase, none of the references discloses a bed of free-floating coalescing bodies floating on liquid within a gravity separation device. Further, none of the references disclose that it is essential that the coalescing bodies be less dense than the liquids to be separated. A need exists for a method of coalescing a dispersed phase within a gravity separation device that utilizes downward introduction of emulsion wherein coalescence occurs prior to incoming emulsion contacting emulsion within the separation device.

SUMMARY OF THE INVENTION

The object of the present invention is to improve the separating efficiency of a gravity separation device of the type where an emulsion requiring separation is introduced downwardly into the gravity separation device. A further object of the invention is to utilize coalescing bodies to achieve the improvement. Other objects of the present invention appear hereinafter.

In one aspect, the invention is a method of coalescing the droplets of an emulsion, the emulsion comprising droplets of a first liquid having a first density and a continuous phase of a second liquid having a second density, the method comprising contacting a plurality of bodies, having an affinity for the first liquid and a third density lower than the first and second densities, with the emulsion. In a second aspect, the invention is a method of separating droplets of a first liquid having a first density from a continuous phase of a second liquid having a second density, which method comprises the steps of: (a) contacting a plurality of coalescing bodies in a gravity separation device with an emulsion comprised of the droplets and the continuous phase, the coalescing bodies having an affinity for the first liquid and having a third density which is lower than the first and second densities; (b) partitioning the droplets from the continuous phase within the gravity separation device; and (c) removing from the gravity separation device the partitioned droplets and the partitioned continuous phase.

The objects of this invention can be attained by utilizing a gravity separation device to which a plurality of coalescing bodies have been added. The method is directed toward separating droplets of a first liquid from a continuous phase of a second liquid of a different density. A sufficient quantity of coalescing bodies is added to the gravity separation device to entirely fill the cross-sectional area of the gravity separation device, such that emulsion introduced downwardly onto the coalescing bodies contacts a body before contacting liquid below the coalescing bodies. Generally, at least two layers of the coalescing bodies are required. The coalescing bodies have an affinity for the droplets and are less dense than either liquid, so they float on top of liquid in the gravity separation device. The coalescing bodies are contacted with an emulsion comprising the droplets and the continuous phase before the emulsion contacts liquid within the gravity separation device. The emulsion is introduced downwardly onto the coalescing bodies and percolates downwardly through the coalescing bodies. The droplets are attracted to the coalescing bodies and coalesce into larger droplets before entering the gravity separation device.

The increased droplet size improves the separating efficiency of the gravity separation device. If the droplets are the lower density liquid, they are less likely to settle and be removed with the greater density liquid. If the droplets are the greater density liquid, they are more likely to settle and less likely to be removed with the lower density liquid.

The droplets are partitioned from the continuous phase within the gravity separation device via gravity separation. The partitioned droplets and partitioned continuous phase are removed from the gravity separation device.

Advantageous features of the present invention are that the emulsion is introduced downwardly into the gravity separation device, thus the lower density liquid is not required to rise prior to removal; the coalescing bodies disperse the emulsion and absorb the kinetic energy of the emulsion so that agitation of liquid within the gravity separation device is reduced; and the coalescing bodies float on top of any liquid in the separation device; thus droplets within the emulsion coalesce into larger droplets before being separated within the gravity separation device and are not easily removed with the other liquid.

DETAILED DESCRIPTION OF THE PREFERRED EMBODIMENT

The invention is generally a method of separating liquid droplets from a continuous phase of a second liquid. The invention is more particularly a method of coalescing droplets of an emulsion. The method utilizes a gravity separation device to which a plurality of coalescing bodies have been added. The coalescing bodies have an affinity for the liquid droplets and are less dense than the liquid droplets and the second liquid, so the bodies float on liquid within the gravity separation device. The coalescing bodies are restrained from below only by the bottom of the gravity separation device or by any liquid within the gravity separation device and are restrained by the side walls of the separation device. The coalescing bodies are not restrained from above. Thus, the coalescing bodies form a free-floating, permeable coalescing bed. A sufficient quantity of coalescing bodies is added to a gravity separation device to entirely fill the cross-sectional area of the gravity separation device, such that emulsion introduced downwardly onto the coalescing bodies contacts a coalescing body before contacting liquid below the coalescing bodies or the bottom of the gravity separation device, if no liquid is in the gravity separation device. The coalescing bodies are contacted with an emulsion comprising the droplets and the continuous phase before the emulsion contacts liquid within the separation device or the bottom of the separation device.

The emulsion can be comprised of any two liquids having different densities. The present invention is primarily directed toward oil in water emulsions or, alternatively, water in oil emulsions.

As used in the present invention, "oleophilic body" refers to a body having an affinity for oil such that oil is attracted to the body; "hydrophilic body" refers to a body having an affinity for water such that water is attracted to the body; "coalescence" refers to a mechanism whereby liquid droplets unite to form larger droplets; "emulsion" refers to a liquid/liquid mixture comprising droplets of a first liquid dispersed within a continuous phase of a second liquid; "liquid droplets" refers to the droplets within an emulsion; and "continuous liquid phase" refers to the liquid in an emulsion that is not dispersed.

DESCRIPTION OF THE APPARATUS

Figure 1:
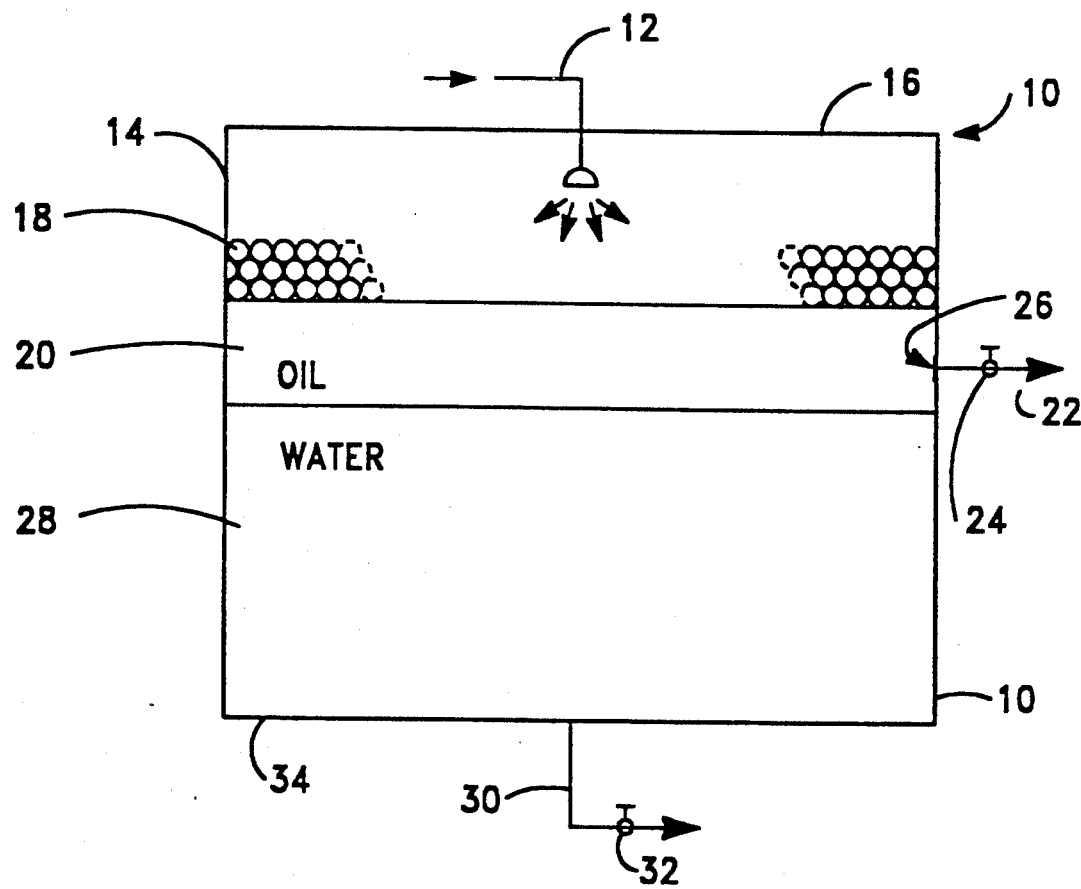
FIG. 1 is a cross-sectional, elevational view of an interior of a gravity separation device having a plurality of coalescing bodies for assisting droplet coalescence.
Figure 2:
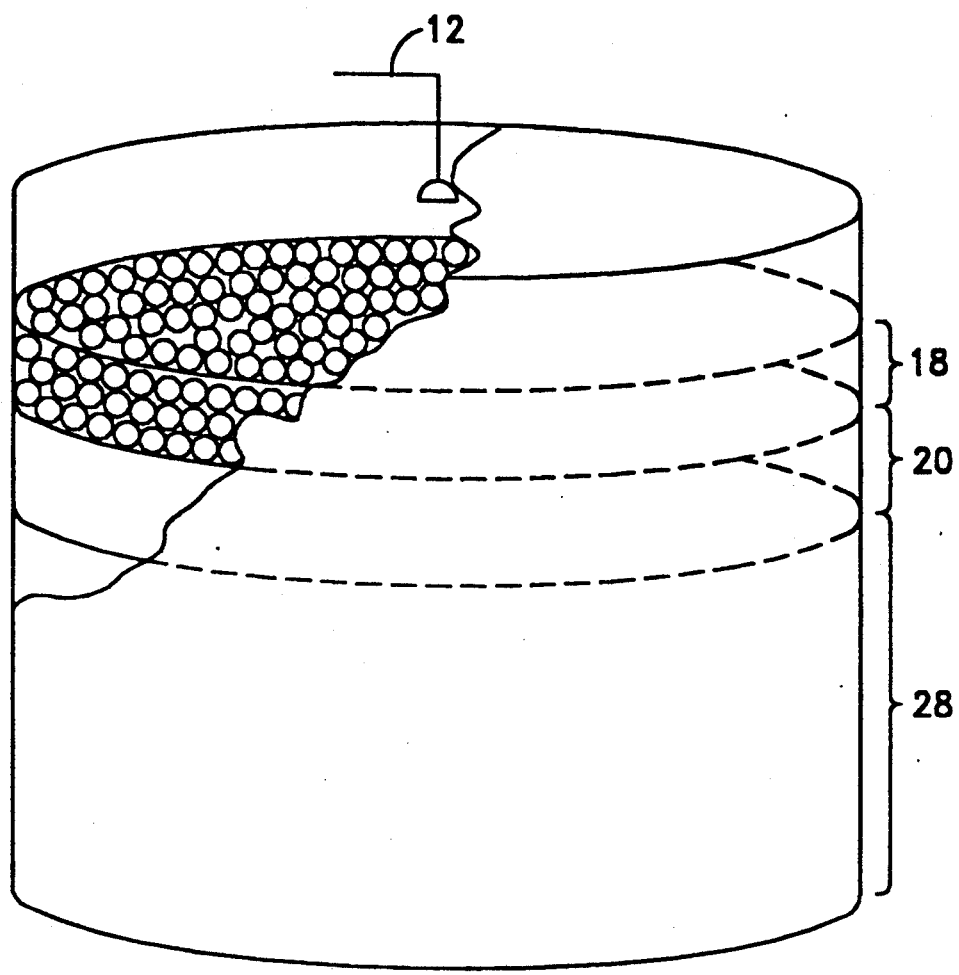
FIG. 2 is a perspective, partial cut-away view of a plurality of coalescing bodies used in one embodiment of the present invention.

As shown in FIG. 1, the present invention operates preferably within a settling tank 10, which has an inlet 12, a top 14, a lid 16, a plurality of coalescing bodies 18, an oil layer 20, an upper oil outlet 22 with an oil outlet valve 24 and a protective screen 26, a water layer 28, a lower water outlet 30 with a water outlet valve 32, and a bottom portion 34.

The settling tank 10 can be any vessel, reactor, tank, container, etc., through which an emulsion is passed downwardly to allow the liquids to separate via gravity separation. The preferred embodiment of the present invention utilizes a large settling tank commonly used in the oil production industry.

The configuration and size of settling tank 10 have not been found to affect the method of the invention as long as sufficient coalescing bodies are added to the tank to absorb the kinetic energy of incoming emulsion. Preferably, the settling tank 10 is sized according to the rate of introduction of the emulsion. For example, it is desired, on an average, that the emulsion reside within the settling tank 10 for one-half hour to permit separation to occur. Accordingly, for a 1000 barrel/hour input, the settling tank 10 would be sized at about 500 barrels to achieve the average one-half hour residence time of the emulsion within the settling tank 10.

Likewise, the color and material of composition of the tank have not been found to affect the method of the present invention. Thus, any color and/or material of composition used in constructing settling tanks may be utilized in the method of the present invention.

The inlet 12 is preferably a device that uniformly distributes the emulsion as droplets downwardly onto the coalescing bodies. To insure that the kinetic energy of the incoming emulsion droplets is absorbed by the plurality of coalescing bodies 18, the emulsion droplets are preferably less than one-half the equivalent diameter of the coalescing bodies.

The inlet 12 can be a single spray apparatus, a plurality of spray apparatuses, or any apparatus or combination of apparatuses that introduce the emulsion downwardly onto the plurality of coalescing bodies 18 at a rate such that the kinetic energy of the incoming emulsion is absorbed by the plurality of coalescing bodies.

The plurality of coalescing bodies 18 float on top of the separated oil layer 20 within the settling tank 10. The plurality of coalescing bodies 18 are preferably restrained from below only by oil layer 20 or by the bottom portion 34 of settling tank 10. The plurality of coalescing bodies 18 are restrained by the side walls of settling tank 10. Otherwise, the plurality of coalescing bodies 18 is preferably unrestrained to avoid plugging of the bed of coalescing bodies with solid particles within the emulsion.

Spherical coalescing bodies 18 are preferred because they form non-rigid, well-packed layers which will facilitate passage therethrough of any solid particles within the emulsion while providing sufficient surface area to insure that emulsion will contact a coalescing body prior to contacting liquid within the settling tank 10. Spherical coalescing bodies having diameters ranging from ½ to 4 in. are preferred because they are commercially available. Preferably, the plurality of coalescing bodies 18 are arranged in the settling tank 10 in layers leaving no open spaces and which fill the cross-sectional area of settling tank 10 to insure that the incoming emulsion must contact a coalescing body before being introduced into tank 10. When the plurality of coalescing bodies 18 are spherical, 2-5 layers of the bodies is preferable. Less than two layers would leave open spaces which would allow some of the incoming emulsion to contact oil layer 20 directly without first contacting one of the coalescing bodies. This direct contact could cause agitation in the tank which would decrease the separating efficiency of the tank. More than 5 layers provides no advantage. A spherical coalescing body having a diameter of 1/16 in. or less is disadvantageous because the layers of spheres of this smaller size would not be sufficiently permeable, i.e., they would tend to pack tightly. A spherical coalescing body having a diameter of 1/10 the diameter of the tank or greater is disadvantageous because of the difficulty in forming layers of these bodies which would leave no open spaces. Broadly, any noninterlocking bodies or combination of noninterlocking bodies may be used. The noninterlocking feature is important because the invention requires that the coalescing bodies form non-rigid layers.

Preferably, the coalescing bodies have an affinity for the liquid droplets within the emulsion requiring separation so that the liquid droplets will be attracted to the coalescing bodies and will coalesce into larger droplets as a result of that attraction. If an oil-water emulsion is to be separated, the coalescing bodies are preferably oleophilic. If a water-oil emulsion is to be separated, the coalescing bodies are preferably hydrophilic. Preferably, the oleophilic bodies are made of an oleophilic polyolefin, for example, polypropylene, polyethylene or polymethylpentene. However, other material of compositions which are oleophilic and less dense than the oil to be separated are included in the present embodiment of the invention.

Preferably, the coalescing bodies are foam filled or hollow so that they will be less dense than the liquids requiring separation. Coalescing bodies which are comprised of polymethylpentene may be solid. The bodies must be less dense than the oil in oil layer 20.

Preferably, the water outlet 30 is centered on the bottom portion 34 of the settling tank 10, because a water outlet centered on the bottom of a settling tank achieves the best volumetric utilization of the settling tank. Alternatively, the water outlet 30 can be located on a lower side portion of settling tank 10. The oil outlet 22 is preferably located on an upper side portion of the tank 10. The water outlet 30 is located within the water layer 28 and the oil outlet 22 is located within the oil layer 20. The oil outlet valve 24 and the water outlet valve 32 may be manually or automatically controlled. The oil outlet 22 is protected by a screen 26 to prevent the plurality of bodies from exiting through the oil outlet 22.

DESCRIPTION OF THE METHOD

Settling tank 10 as previously described is utilized in the present method. An emulsion comprising oil droplets and a continuous aqueous phase is directed downwardly in droplet form onto the coalescing bodies 18 via inlet 12. The coalescing bodies 18 are contacted with the emulsion before the emulsion contacts oil layer 20. The quantity and arrangement of coalescing bodies is sufficient to insure that each droplet of the emulsion contacts a coalescing body before contacting oil layer 20. The emulsion percolates downwardly through the coalescing bodies 18 into oil layer 20. Oil droplets are attracted to the coalescing bodies and coalesce into larger droplets. Coalesced oil droplets are partitioned from the continuous aqueous phase within the gravity separation device by gravity separation. Partitioned oil is removed from the gravity separation device through oil outlet 22 and partitioned water is removed from the gravity separation device through water outlet 30.

EXAMPLE

A test was conducted to compare the oil/water separating efficiency of a standard cylindrical vortex settling tank, commonly used in the oil production industry, to the separating efficiency of a cylindrical settling tank of the same size as the vortex tank and incorporating the features of the present invention.

A 50-gallon cylindrical vortex tank included a convergent/divergent nozzle for tangentially introducing an oil/water mixture into an upper portion of the cylindrical tank. The cylindrical vortex tank had a diameter of 30 inches and a height of 32 inches.

A 50-gallon cylindrical settling tank included a spray nozzle positioned above the surface of a bed of three layers of hollow, spherical, one-half inch diameter spherical bodies comprised of polyethylene. The cylindrical settling tank had a diameter of 30 inches and a height of 32 inches.

An oil/water emulsion, comprised of Levelland, Tex. crude oil having an API gravity of 32 and tap water, was introduced into both the cylindrical vortex tank and the cylindrical settling tank at a rate of one gallon per minute at room temperature to provide a residence time for the emulsion of about 50 minutes in each tank.

The droplet size of the oil in the oil/water emulsion was varied from below 20 microns to above 60 microns.

The separating efficiency of each tank was measured in the following manner: The concentration of oil in the incoming oil/water emulsion was measured by taking a 500 ml sample and extracting the oil with 100 ml of freon or carbon tetrachloride. The concentration of oil in the extract was measured using infrared spectrometry and converted to concentration of oil in the incoming oil/water emulsion. The amount of oil in the incoming oil/water emulsion was determined by multiplying the concentration of oil by the flowrate of the incoming oil/water emulsion. Similarly, the amount of oil in the underflow, or water recovered, was measured. The percent of oil recovered, or separating efficiency, was calculated by subtracting the amount of oil in the underflow from the amount of oil in the incoming oil/water emulsion, dividing the difference by the amount of oil in the incoming oil/water emulsion, and multiplying the quotient by 100 to convert to a percentage of oil recovered.

Figure 3:
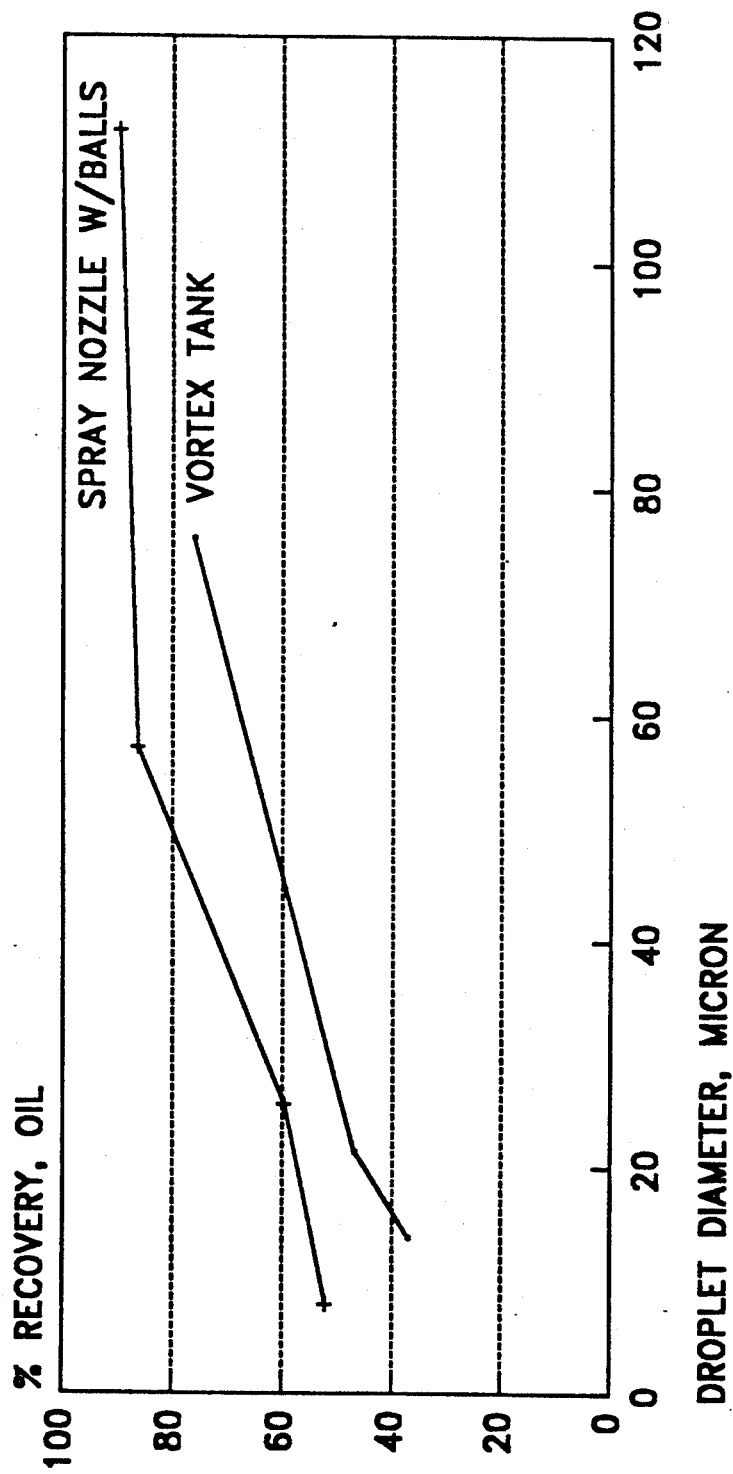
FIG. 3 is a graphical comparison of the oil separating efficiencies of a vortex settling tank and a settling tank utilizing oleophilic bodies and introduction of an oil/-water emulsion downwardly onto the oleophilic bodies, as utilized in one embodiment of the present invention.

Referring now to FIG. 3, the separating efficiencies of the cylindrical vortex tank and cylindrical settling tank embodying the present invention show that the separating efficiency of the cylindrical settling tank embodying the present invention is consistently higher than that of the cylindrical vortex tank. At a large (>60 micron) oil droplet size, the cylindrical settling tank embodying the present invention recovered about 90% of the oil and the vortex tank recovered about 75% of the oil. At a small (<20 micron) oil droplet size, the cylindrical settling tank embodying the present invention recovered about 55% of the oil and the cylindrical vortex tank recovered about 39% of the oil.

While presently preferred embodiments of the invention have been described herein for the purpose of disclosure, numerous changes will suggest themselves to those skilled in the art, which changes are encompassed within the spirit of this invention as defined by the following claims.

What is claimed is:

1. A method of separating droplets of a first liquid having a first density from a continuous phase of a second liquid having a second density, which method comprises the steps of:
   (a) introducing an emulsion comprised of the droplets and the continuous phase downwardly onto a plurality of coalescing bodies in a gravity separation device, the coalescing bodies having an affinity for the first liquid and having a third density which is lower than the first and second densities;
   (b) partitioning the droplets from the continuous phase within the gravity separation device for forming first and second liquid layers below the coalescing bodies; and
   (c) removing from the gravity separation device the partitioned droplets within the first liquid layer through a first outlet below the coalescing bodies and the partitioned continuous phase within the second liquid layer through a second outlet below the coalescing bodies.

2. A method as in claim 1 wherein the first liquid is oil, the second liquid is water, and the coalescing bodies are oleophilic.

3. A method as in claim 1 wherein the first liquid is water, the second liquid is oil, and the coalescing bodies are hydrophilic.

4. A method as in claim 1 wherein the emulsion is introduced as a spray.

5. A method as in claim 1 wherein the coalescing bodies fill the cross-sectional area of the gravity separation device such that emulsion introduced downwardly onto the coalescing bodies contacts the bodies before contacting liquid below the coalescing bodies.

6. A method as in claim 1 wherein the emulsion has sufficiently low kinetic energy to be absorbed by the coalescing bodies.

7. A method of separating oil droplets from a continuous aqueous phase, which method comprises the steps of:
   (a) introducing an emulsion comprised of the oil droplets and the continuous aqueous phase downwardly onto a plurality of coalescing bodies in a gravity separation device, the coalescing bodies having an affinity for the oil and having a density less than the oil;
   (b) partitioning the oil droplets from the continuous aqueous phase within the gravity separation device for forming oil and aqueous layers below the coalescing bodies; and
   (c) removing from the gravity separation device the partitioned oil droplets within the oil layer through a first outlet below the coalescing bodies and the partitioned aqueous continuous phase within the aqueous phase through a second outlet below the coalescing bodies.

* * * * *